United States Patent [19]

Kawabe et al.

[11] Patent Number: 5,296,979
[45] Date of Patent: Mar. 22, 1994

[54] MAGNETIC DISC APPARATUS WITH THIN FILM HEAD SUITABLE FOR HIGH-DENSITY RECORDING

[75] Inventors: Takashi Kawabe; Moriaki Fuyama, both of Hitachi; Shinji Narishige, Mito; Masatoshi Tsuchiya, Hitachi; Eiji Ashida, Hitachiota; Makoto Morijiri; Hideki Yamazaki, both of Hitachi; Yutaka Sugita, Tokorozawa; Hiroshi Fukui, Hitachi; Tadayuki Iwakura, Hitachi; Makoto Aihara, Hitachi; Makoto Saito, Tokyo; Shunichiro Kuwatsuka; Hiroshi Ikeda, both of Odawara; Yokuo Saitoh, Kanagawa, all of Japan

[73] Assignee: Hitachi, Ltd., Tokyo, Japan

[21] Appl. No.: 963,039

[22] Filed: Oct. 19, 1992

Related U.S. Application Data

[63] Continuation of Ser. No. 890,111, May 29, 1992, abandoned, which is a continuation of Ser. No. 406,517, Sep. 13, 1989, abandoned.

[30] Foreign Application Priority Data

Sep. 20, 1988 [JP] Japan .................. 63-233430

[51] Int. Cl.$^5$ .............................................. G11B 5/012
[52] U.S. Cl. ..................... 360/97.01; 360/98.01; 360/125; 360/119
[58] Field of Search ............... 360/102, 103, 119, 113, 360/122, 124, 125, 126, 127, 97.01, 98.01; 29/603

[56] References Cited

U.S. PATENT DOCUMENTS

| | | | |
|---|---|---|---|
| 4,219,855 | 8/1980 | Jones, Jr. ...................... | 360/125 |
| 4,799,118 | 1/1989 | Yamada et al. ................ | 360/122 X |
| 4,951,166 | 8/1990 | Schewe ......................... | 360/122 X |
| 4,970,615 | 11/1990 | Gau ............................... | 360/122 |
| 4,970,616 | 11/1990 | Ramaswamy .................. | 360/122 |

OTHER PUBLICATIONS

R. Jones, Jr., "IBM 3370 Film Head Design and Fabrication", *IBM Disk Storage Technology*, Feb. 1980, pp. 6-9.

J. Kishigami et al., "Three-Dimensional Stray Field Analysis on Film Heads", *Shingaku Giho*, vol. 85, No. 137, MR85-22, 1985, pp. 1-8 (with partial English translation).

M. Re et al., "Magneto-optic Determination of Magnetic Recording Head Fields", *IEEE Transactions on Magnetics*, vol. MAG-22, No. 5, Sep. 1986, pp. 840-842.

M. Hanazono et al., "Design and Fabrication of Thin-film Heads Based on a Dry Process (Invited)", *Journal of Applied Physics*, vol. 61, No. 8, Apr. 15, 1987, pp. 4157-4162.

*Patent Abstracts of Japan*, P-674, vol. 12, No. 74, Mar. 9, 1988 (for Japanese Kokai 62-212910).

*Primary Examiner*—Andrew L. Sniezek
*Attorney, Agent, or Firm*—Antonelli, Terry, Stout & Kraus

[57] ABSTRACT

A magnetic disc apparatus includes a magnetic disc for recording information; a thin film magnetic head including a magnetic pole structure having an upper magnetic pole tip and a lower magnetic pole tip arranged to provide a magnetic gap at respective end portions thereof for writing and reading information in and from the magnetic disc; a device for rotating the magnetic disc; and a device for positioning the thin film magnetic head; the upper and lower magnetic pole tips having different contours at the respective end portions as viewed from a side confronting the magnetic disc wherein the difference ($\Delta CW$ in $\mu m$) in the width, along the magnetic gap, of the upper magnetic pole tip and the width, along the magnetic gap, of the lower magnetic pole tip satisfies the relation $$0 < \Delta CW \leq 5000/Tr$$

for the magnetic disc having a track density Tr of 1800 or more tracks per inch.

36 Claims, 7 Drawing Sheets $$\Delta C_W = |C_{WD} - C_{WU}|$$

$\Delta C_W = |C_{WD} - C_{WU}|$

Z-DIRECTION DISTANCE $$\Delta C_W' = 1/2 |C_{WU} - C_{WD}|$$

MAGNETIC DISC APPARATUS WITH THIN FILM HEAD SUITABLE FOR HIGH-DENSITY RECORDING

This application is a continuation of application Ser. No. 890,111 filed on May 29, 1992, which is a continuation of application Ser. No. 406,517 filed on Sep. 13, 1989, now abandoned.

BACKGROUND OF THE INVENTION

1. Field of The Invention

This invention relates to a magnetic disc apparatus and a method of recording and reproducing information in the magnetic disc apparatus, and more particularly to a magnetic disc apparatus suitable for use as an external storage of a host device such as computer, to a thin film magnetic head for use in that magnetic disc apparatus and to a method for recording/reproduction of information in that magnetic disc apparatus.

2. Description of The Prior Art

Concomitantly with an increase in the storage capacity of the magnetic disc apparatus, the track density of the magnetic disc tends to increase more and more.

Therefore, the dimension of the track width of the magnetic pole tip of the thin film magnetic head mounted to the magnetic disc apparatus is decreased more and more.

In the thin film magnetic head, upper and lower magnetic cores form a magnetic circuit having a gap at their tips confronting the magnetic disc with an insulating film of a non-magnetic material interposed therebetween.

The magnetic circuit is activated to permit writing or reading a recording medium exemplified as the magnetic disc The magnetized state of the recording medium which governs the recording density is affected by the magnitude of a magnetic field generated in the magnetic gap region.

The configuration of the upper and lower magnetic pole tips of the thin film magnetic head confronting the magnetic disc is one of the main factors for determining the recording density of the magnetic disc apparatus.

The configuration of the magnetic pole tip confronting the magnetic disc has hitherto been studied from various viewpoints.

The difference in width between the upper and lower magnetic pole tips has not been noticed frequently but is particularly referred to in U.S. Pat. No. 4,219,855 and in SHINGAKU GIHO, Vol. 85, No. 137, MR85-22 (1985). The term "width" of the magnetic pole tip indicates a lateral dimension of the pole tip face to be faced to the recording medium when recording or reproducing as measured in a direction perpendicular to the direction of movement of the magnetic head relative to the recording medium.

U.S. Pat. No. 4,219,855 describes that by making the width of the upper magnetic core tip smaller than that of the lower magnetic pole tip, an undesirable contour called a wraparound due to non-uniformity in manufacture can be avoided.

In SHINGAKU GIHO, Vol. 85, No. 137, MR85-22 (1985), computer simulation is used to study the relation of the difference in width between the upper and lower magnetic pole tips to the magnitude of a magnetic field at fringes of both sides of the magnetic pole tips. The term "magnetic fringe field" or "fringe flux" is used in this specification to indicate a part of the magnetic field or flux produced by a magnetic head at fringes slightly exceeding the width of the magnetic pole tip.

The latter literature describes that the magnetic fringe field adversely affects write/read characteristics and therefore the difference in width between the upper and lower magnetic pole tips should desirably be zero. The fringe field is also disclosed in "Magneto-optic Determination of Magnetic Recording Head Fields" by Mark E. Re et al. in IEEE Transaction on Magnetics. Vol. MAG. 22, No. 5, September 1986.

The prior art described in the aforementioned U.S. Pat. No. 4,219,855 fails to refer to how much the prescribed difference in width between the upper and lower magnetic pole tips should be in order to obtain a magnetic field distribution suitable for increasing the recording density.

Also, the prior art described in the aforementioned SHINGAKU GIHO, Vol. 85, No. 137, MR85-22 (1985) in no way points out that as the track width decreases, the magnetic fringe field rather improves write/read characteristics.

Further, neither of these two references gives the knowledge of the optimum relation between the track density of the magnetic disc and the difference in width between the upper and lower magnetic pole tips which is optimized for increasing the recording density of the magnetic disc apparatus.

SUMMARY OF THE INVENTION

An object of this invention is to clarify the relation between the track density of the magnetic disc and an optimum value of the difference in width between the upper and lower magnetic pole tips, which relation is not considered by the prior art, and to provide a magnetic disc apparatus capable of increasing the S/N ratio and improving off-track characteristics by taking the clarified condition into consideration even when the recording density is increased. The "offtrack characteristic" indicates a maximum allowable deviation of the magnetic head position from a position precisely facing to a recording track where information recorded on the track can be correctly read out by the magnetic head.

Another object of this invention is to clarify conditions imposed on the contour of the parts, exposed at its plane confronting the recording medium, of the magnetic core of a thin film magnetic head particularly used in a magnetic disc apparatus having a track density of 1800 or more tracks per inch, and to provide a magnetic disc apparatus carrying a thin film magnetic head satisfying such conditions.

Still another object of this invention is to clarify preferable constructions of a thin film magnetic head and a magnetic disc which are used in the magnetic disc apparatus having a track density of 1800 or more tracks per inch, and to provide the thin film magnetic head and magnetic disc having the preferable constructions.

Still another object of this invention is to provide a recording system using the magnetic disc apparatus having a track density of 1800 or more tracks per inch.

Still another object of this invention is to provide a method of recording and reproducing information in the above type of magnetic disc apparatus.

According to the invention, the magnetic disc apparatus comprises a magnetic disc for recording information, a thin film magnetic head for writing and reading information in and from the magnetic disc, means for rotating the magnetic disc, and means for positioning the thin film magnetic head.

DESCRIPTION OF THE PREFERRED EMBODIMENTS

Figure 9:
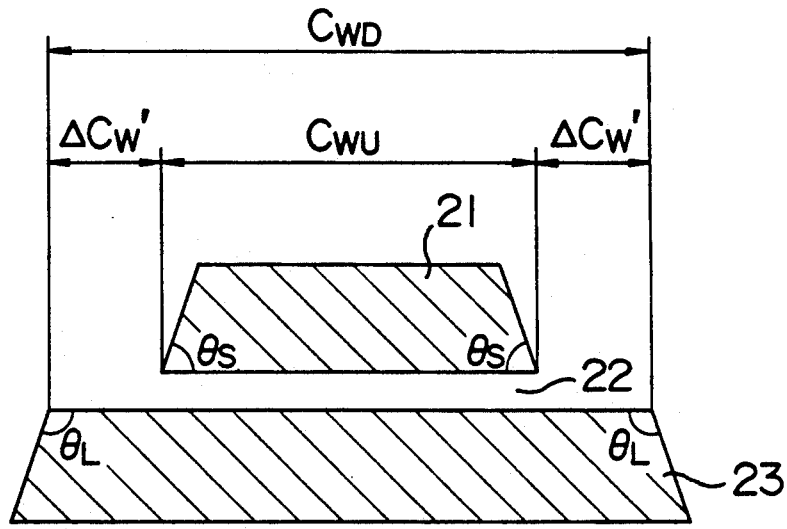
FIG. 9 is a front view illustrating a usual contour configuration of the magnetic pole tip of the thin film magnetic head

FIG. 9 exemplifies, in enlarged form, contours of magnetic pole tips, exposed at its plane facing to the recording medium, of the thin film magnetic head used in the magnetic disc apparatus and a magnetic gap region between the magnetic pole tips.

An upper magnetic pole tip 21 has an end along a magnetic gap 22 and having a width represented by CWU ($\mu$m), and a lower magnetic pole tip 23 has an end along the magnetic gap 22 and having a width represented by CWD ($\mu$m). The terms "upper" and "lower" are used as viewed when the magnetic head is positioned with its base plate being lowermost.

In the present invention, under the condition that the track density (Tr) of the magnetic disc is 1800 or more (tracks/inch), the difference ($\Delta$CW) between CWU and CWD satisfies the following relation:

$$0 < \Delta CW \leq 5000/Tr (\mu m)$$

In addition, the longer one of the CWU and CWD is prescribed to be smaller than the track pitch of the magnetic disc and larger than its track width.

Figure 10:
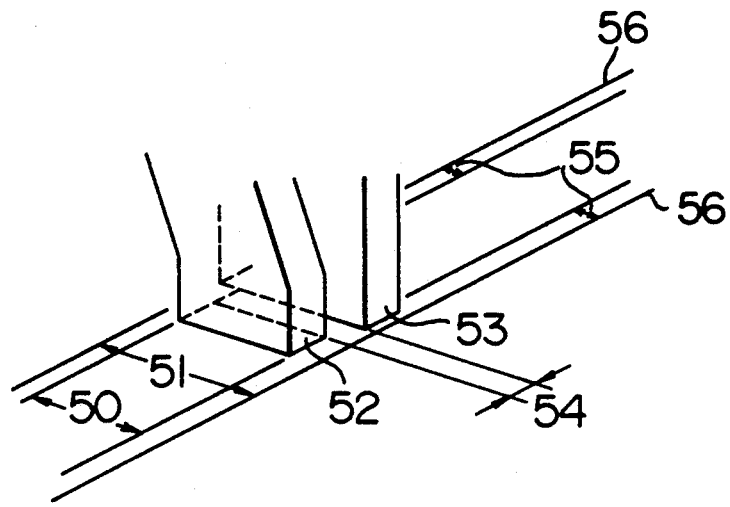
FIG. 10 is a fragmentary diagram showing the positional relation between a track and a thin film magnetic head an the magnetic disc.

On the assumption that CWU is shorter, the track pitch of the magnetic disc is related to the track width of the magnetic disc, as shown in FIG. 10.

The track width is designated by reference numeral 50 and stands for a width across which information is recorded on the magnetic disc and which is determined by the shorter one of the CWU and CWD.

In FIG. 10, a line 56 indicates a center line of a space between two adjacent tracks called a "guard band". Please note that each part designated by 55 in FIG. 10 is one half of the guard band. The track pitch of the magnetic disc is designated by reference numeral 51 and stands for a width which is as large as the track width 50 plus the guard band which is provided as a protection zone for preventing overlap of information on adjacent tracks.

In FIG. 10, the upper magnetic pole tip is denoted by reference numeral 52, the lower magnetic pole tip by 53 and the magnetic gap region by 54.

Under the foregoing dimensional condition, the S/N ratio is high and the off-track characteristics are improved.

Thus, the present invention is based on a technical idea that in order to increase the S/N ratio and improve the off-track characteristics even in the case of the track density being increased, contours of the magnetic pole tips must be controlled with high accuracies in compliance with the track density.

The optimum range of $\Delta$CW satisfying the aforementioned relation can be valid even when the magnetic disc has a track density not larger than 1800 (tracks/inch).

For a low track density, the S/N ratio of the magnetic disc apparatus is greatly affected by factors other than $\Delta$CW and in the past there was no need of substantially prescribe values of $\Delta$CW.

However, for the track density being 1800 or more (tracks/inch), the value of $\Delta$CW has been proved to greatly affect the S/N ratio of the magnetic disc apparatus.

More specifically, in a magnetic disc apparatus of high recording density which is of 1800 or more (tracks/inch) track density, the track pitch of the magnetic disc measures about 14 $\mu$m.

In compliance therewith, the contours of the magnetic pole tips of the thin film magnetic head exposed to its plane confronting the magnetic disc adapted to record information are required to be small; otherwise crosstalk would occur across adjacent tracks to degrade the S/N ratio and prevent accurate reproduction of information.

Particularly, the track width corresponding to the smaller one of CWU and CWD, an important factor for writing information, inevitably measures smaller than the track pitch of the magnetic disc on account of the presence of the guard bands.

However, the manufacturing process imposes constraints on the reduction in size of the magnetic pole tip and too small a magnetic pole tip will jeopardize effective reading of information.

By considering not only the importance of the contour dimension of the magnetic core under the circumstances but also the accuracy of the positioning of the magnetic disc apparatus, the inventors of the present invention have conceived that the CWU should differ from the CWD to provide a difference therebetween and a fringe magnetic field due to the difference should be utilized positively to advantage.

The CWU and CWD must be prescribed strictly to produce a properly controlled fringe magnetic field and the fringe magnetic field due to the difference is used to write information on a wide area, thereby improving the off-track characteristics.

The effect of the present invention is due to magnetic fringe fields at regions contiguous to the both lateral ends of each of the magnetic pole tips and therefore the difference ($\Delta CW'$) between each of the lateral ends of a side (CWU) of the upper magnetic pole tip along the magnetic gap, and the corresponding end of a side (CWD) of the lower magnetic pole tip along the magnetic gap, satisfies the following relation:

$$0 < \Delta CW' \leq 2500/Tr(\mu m)$$

As in the case of the previously described dimensional relation, this relation proved to increase the S/N ratio and improve the off-track characteristics.

Practically, in consideration of manufacturing process, the lower limit of $\Delta CW$ may preferably be 0.2 $\mu$m and the lower limit of $\Delta CW'$ may preferably be 0.1 $\mu$m.

It has also been proved that in order to make uniform magnetic fields leaking into regions near the lateral ends of each of the magnetic pole tips thereby improving the off-track characteristics, the upper magnetic pole tip is preferably arranged substantially symmetrically with respect to the central symmetrical axis of the lower magnetic pole tip in the direction of writing and reading thereof.

On the other hand, for the purpose of increasing the recording density of the magnetic disc apparatus, the track density as well as the linear recording density must be increased.

Since the S/N ratio decreases as the linear recording density increases, proper control of the value of $\Delta CW$ or $\Delta CW'$ prescribed by the present invention is of great significance.

Preferably, the linear recording density proves to be 30 or more kilo-bits per inch.

Further, the area recording density similarly proves to be preferably 54 or more megabits per square inch.

As described above, by accurately controlling the difference in length between the sides, along the magnetic gap, of the upper and lower magnetic pole tips and maintaining the difference within an optimum range, the high recording density of the magnetic disc apparatus can be ensured with the S/N ratio increased and the offtrack characteristics improved On the other hand, the fringe magnetic field varies depending on the width of the sides of the magnetic pole tips as well as angles at the lateral ends of the magnetic pole tips. The variation in this connection has been studied by the present inventors.

It has thus been determined that in order to establish an effective fringe magnetic field region, the angle ($\theta_S$) between the end edge of the magnetic pole tip and its side facing the magnetic gap is preferably controlled so as to lie within the range $$45° \leq \theta_S \leq 150°$$

for the one of the upper and lower magnetic pole tips which has a shorter side (CWU or CWD) along the magnetic gap.

For $\theta_S < 45°$, the magnetic core and edge are saturated magnetically and as a result an effective magnetic field can not be produced when writing, and the S/N ratio is decreased when reading.

For $\theta_S > 150°$, the track width is increased substantially and an effective magnetic field can not be produced, either.

On the other hand, it has been determined that in order to establish an effective fringe magnetic field region, the angle ($\theta_L$) between the end edge of the magnetic pole tip and its side along the magnetic gap is preferably controlled so as to be within a range $$91° \leq \theta_L \leq 150°$$

for the one of the upper and lower magnetic pole tips having a longer width (CWU or CWD) along the magnetic gap.

It has also been determined that with the optimum ranges of the angles $\theta_S$ and $\theta_L$ satisfied simultaneously, the effect can be promoted.

In this manner, the effective fringe magnetic field region can be established to improve the off-track characteristic and crosstalk characteristics when reading.

Although in the magnetic core configuration shown in FIG. 9 the CWU and CWD are exemplified such that the former is shorter than the latter, the effect of the invention will not be impaired if CWU is wider than CWD.

However, in the practical manufacturing process of the magnetic head having CWU wider than CWD, for the purpose of avoiding the wraparound state, nonmagnetic insulating members having the same thickness as the lower magnetic pole tip have to be disposed adjacently to the lateral ends of the lower magnetic pole tip to provide surfaces coplanar therewith.

A complicated process step is required for formation of the non-magnetic insulating members with an accurate thickness and therefore the CWU is preferably shorter than the CWD.

In the thin film magnetic head, a conductor coil and the insulating film form a step portion having a height of about 10 to 20 $\mu$m and conventionally the upper magnetic pole tip is patterned at the lower level part adjacent to the step portion and worked to provide the side width (CWU) along the magnetic gap.

The value of CWU can be controlled through this pattern formation method so as to be well cooperative with the value (CWD) of the side width, along the magnetic gap, of the lower magnetic pole tip, thereby attaining the effect of the invention but in the practical manufacturing process, it is difficult to work the magnetic core at the lower level part adjacent to the step portion with high dimensional accuracy.

Figure 3:
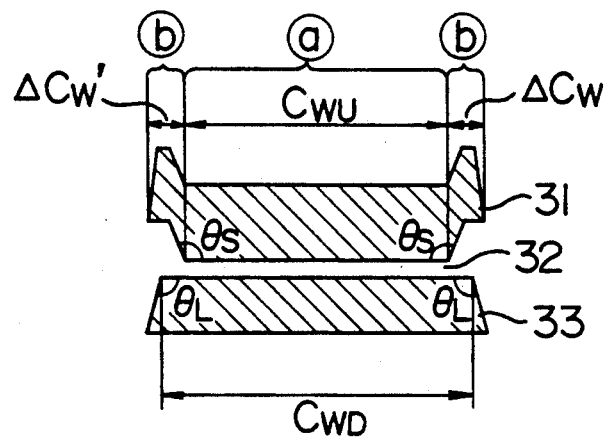
FIG. 3 shows a contour configuration of the magnetic pole tip in another embodiment of the invention.

Under the circumstances, a magnetic pole tip having a contour configuration as shown in FIG. 3 has been contrived as an embodiment of the invention by which accurate formation of the track width of the magnetic core can be readily realized thereby achieving high track density on the magnetic disc.

In this embodiment, an upper magnetic pole tip 31 has a central portion (designated at (a) in FIG. 3) having a side (CWU) which is shorter by $\Delta$CW than a side (CWD) along a magnetic gap 32 of a lower magnetic pole tip 33, and lateral end portions (designated at (b) in FIG. 3) which extend from the central portion in a direction away from the lower magnetic pole tip.

To describe how to make the thin film magnetic head having the configuration shown in FIG. 3, the lower magnetic pole tip is first prepared, and a non-magnetic insulating layer is deposited to cover both sides and both lateral edges of the lower magnetic pole tip so as to form a recess on top of the lower magnetic pole tip.

Subsequently, a magnetic gap film is formed to cover the recess and the upper magnetic film is deposited on the gap film.

In the thin film magnetic head having the contour configuration shown in FIG. 3, the track width of the magnetic pole tip is thus determined by the value of CWU. In this configuration, the step height can be minimized and the CWU dimension can be controlled with high accuracy.

As in the case of the thin film magnetic head having the configuration shown in FIG. 9, it has been determined in connection with the thin film magnetic head having the configuration shown in FIG. 3 that for the magnetic disc apparatus having a track density of 1800 (tracks/inch) or more, the value of $\Delta$CW should be so set as to satisfy $$0 < \Delta CW \leq 5000/Tr(\mu m)$$

It has also been determined that the difference ($\Delta$CW') between the central portion (a) of the upper magnetic pole tip 31 and each of the lateral ends of the lower magnetic pole tip 33 should preferably satisfy $$0 < \Delta CW' \leq 2500/Tr(\mu m)$$

Practically, in consideration of manufacturing process, the lower limit of $\Delta$CW may preferably be 0.2 $\mu$m and the lower limit of $\Delta$CW' may preferably be 0.1 $\mu$m.

Further, in consideration of the desirabilities that the upper magnetic pole tip 31 and lower magnetic pole tip 33 should be arranged symmetrically with respect to the same axis which lies in the direction of writing and reading and that the linear recording density should be 30 or more kilobits per inch and the area recording density should be 54 or more megabits per square inch, it has been determined that the angle at the end edge of the upper magnetic pole tip (designated at $\theta_S$ in FIG. 3) and the angle at the end edge of the lower magnetic pole tip (designated at $\theta_L$ in FIG. 3) should preferably satisfy the following expressions, respectively:

$$45° \leq \theta_S \leq 150°$$

$$91° \leq \theta_L \leq 150°$$

As described previously, for attainment of high recording density, the magnetic member serving as the recording medium on the magnetic disc is required to have a large coercive force and a small thickness.

Preferably, a magnetic member having a coercive force of 600 oersteds or more and a thickness of 0.35 $\mu$m or less may be used with a view of attaining the effect of the invention.

Preferably, with the aim of generating a sufficiently high and effective magnetic field from the magnetic head, each of the magnetic pole tips may be constructed of a single-layer film having a saturation magnetic flux density of one tesla or more or a multilayer film of the same saturation magnetic flux density having interposition of one or more of non-magnetic films, and the number of turns of the conductor coil may be to 18 turns or more.

In order to improve the efficiency of reading and writing of the magnetic disc to attain high recording density, the flying or floating height of the magnetic head must be minimized, and in accordance with the invention may preferably be 0.25 $\mu$m or less.

In the thin film magnetic head of the invention described previously, the difference in width between the upper and lower magnetic pole tips is optimized for obtaining an optimum combination of the fringe magnetic field region when writing and a region where noise is reduced when reading, thereby ensuring that the S/N ratio of the magnetic disc apparatus can be increased and the off-track characteristics can be improved.

Accordingly, the effect of the present invention can be promoted when the thin film magnetic head is of an inductive type which uses the same head for writing and reading information.

However, even when the thin film magnetic head is realized with, for example, a complex type which acts as an inductive type for writing and as an MR type using magnetoresistance for reading, teachings of the invention can be applied to at least the writing part of the thin film magnetic head to thereby attain the effect of the invention.

Since the present invention is based on the relation between the configuration of magnetic pole tip of the thin film magnetic head and the recording density of the magnetic disc apparatus using the magnetic head, no limitation is imposed by the invention upon the method of manufacture of the thin film magnetic head.

However, as far as the pattern for accurately determining end positions of the magnetic pole tip is concerned, it should preferably be formed by dry- or wet-etching a magnetic member prepared through a sputtering process in such a manner as disclosed in M. Hanazono et al. "Design and fabrication of thin-film heads based on a dry process" J. Appl. Phys. Vol. 61, No. 8, pp. 4157–4162 (1987), or by selective plating using a photoresist mask in such a manner as disclosed in R.E. Jones, Jr., "IBM 3370 film Head Design and Fabrication", IBM Disk Storage Technology, February 1980, pp. 6–9.

In addition, in the thin film magnetic head for use in this type of magnetic disc apparatus, $\Delta$CW should satisfy $$0 < \Delta CW \leq 5000/Tr$$

where Tr represents the track density of the magnetic disc.

A recording system using the magnetic disc apparatus may be connected to a host such as a computer system to provide a system of large storage capacity.

As is clear from the foregoing, the invention clarifies conditions imposed on the contour configurations of the magnetic pole tips of the thin film magnetic head, exposed to its plane confronting the recording medium, for use in the magnetic disc apparatus of high recording density having the magnetic disc of a track density of 1800 or more tracks per inch.

Specifically, the difference between a width CWU along the magnetic gap of the upper magnetic pole tip and that CWD of the lower magnetic pole tip is optimized in compliance with the track density of the magnetic disc of the magnetic disc apparatus to increase the S/N ratio and improve the off-track characteristics even when the recording density is high.

Figure 4A:
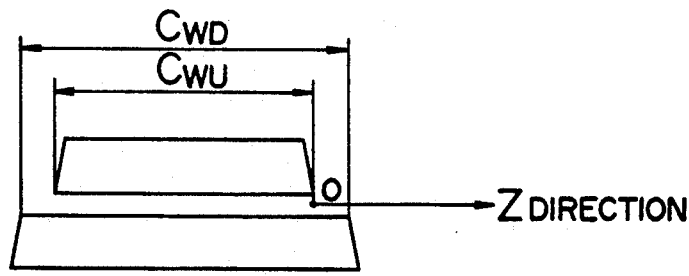
FIGS. 4A, 4B and 4C show the relation between the distance along a line extending from the magnetic gap and the intensity of the magnetic field.

Using the thin film magnetic head having upper and lower magnetic pole tips in which contours facing the recording medium are configured as shown in FIG. 4A, the present inventors have studied the intensity of a magnetic field generated from the magnetic pole tip.

Figure 4B:
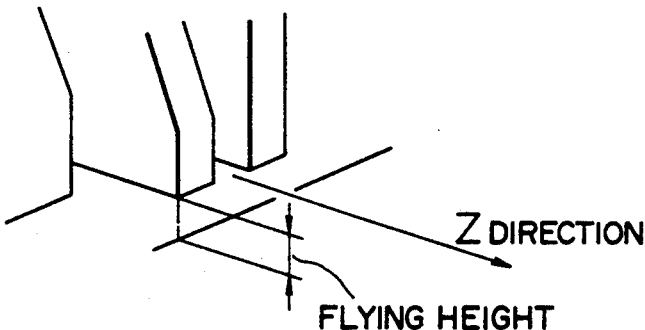

The results show that the intensity of the magnetic field in the longitudinal direction of the recording medium, as measured at a point which lies on a line extending from the magnetic gap in the Z direction as shown in FIG. 4A and which is vertically separated from the surface of the recording medium by the flying height of the thin film magnetic head as shown in FIG. 4B, decreases as the distance on the Z-direction extension from the magnetic gap increases.

Figure 4C:
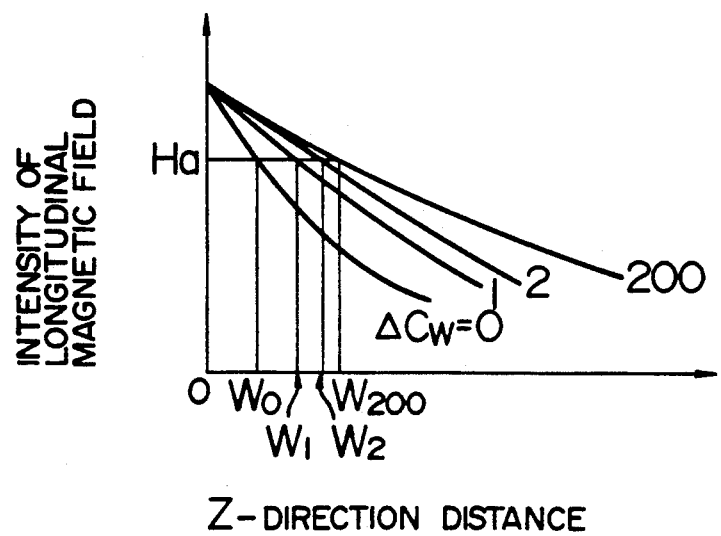

The results also show that as the difference $\Delta CW$ between CWU and CWD increases, the Z-direction distance for a predetermined level Ha of magnetic field intensity increases, as exemplified by distances $W_0$, $W_1$ and $W_2$, but converges to $W_{200}$ as shown in FIG. 4C.

The value of $\Delta CW$ is indicated by 0, 1, 2 and 200 suffixed to $\Delta CW$ and the graphic representation in FIG. 4C shows that the leakage magnetic field is limited in its intensity as the difference $\Delta CW$ increases.

The values $W_0$, $W_1$ and $W_{200}$ of the Z-direction distance correspond to leakage widths of the magnetic field generated from the magnetic pole tip.

Thus, the relation between the value of $\Delta CW$ and the width of the fringe magnetic field can be determined to ensure that the relation between the signal intensity and $\Delta CW$ can be determined when the thin film magnetic head having a predetermined track width is used.

Figure 5:
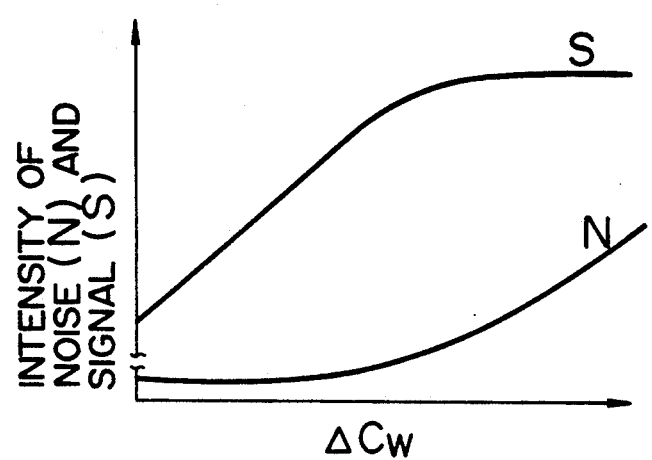
FIG. 5 is a graph showing the relation of signal intensity and noise intensity to the difference in width between the upper and lower magnetic pole tips.

Results are shown at curve S in FIG. 5.

On the other hand, the noise intensity of when reading, particularly crosstalk noise generated from adjacent tracks and off-track noise, increases as the value of $\Delta CW$ increases as shown at curve N in FIG. 5.

Figure 6:
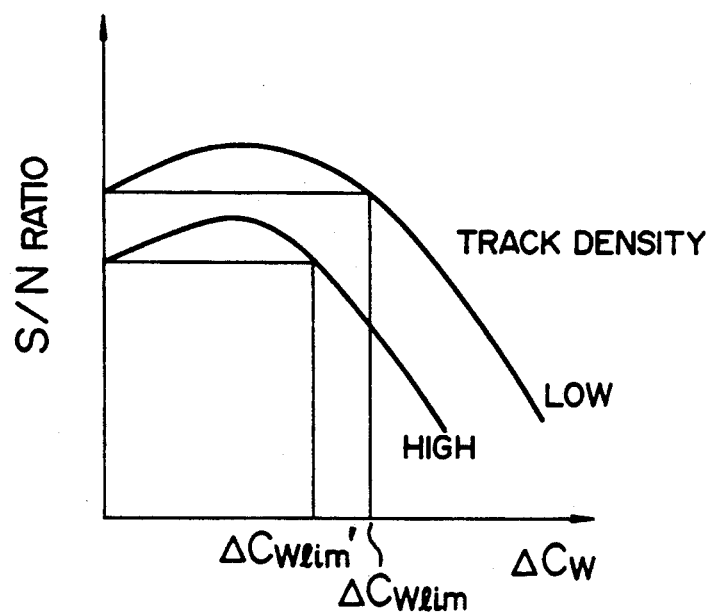
FIG. 6 is a graph showing the relation of S/N ratio to the difference in width between the upper and lower magnetic pole tips.

Accordingly, the relation between the signal/noise ratio (S/N ratio), representative of performance of the magnetic disc apparatus, and $\Delta CW$, is set up as shown in FIG. 6 and it has been determined that the S/N ratio can be higher within the range of $0 < \Delta CW < \Delta CW_{lim}$ than at $\Delta CW = 0$.

FIG. 6 also shows that as the track density of the magnetic disc is further increased, the S/N ratio is decreased and the value of $\Delta CW_{lim}$ is decreased to $\Delta CW_{lim}'$.

Figure 7:
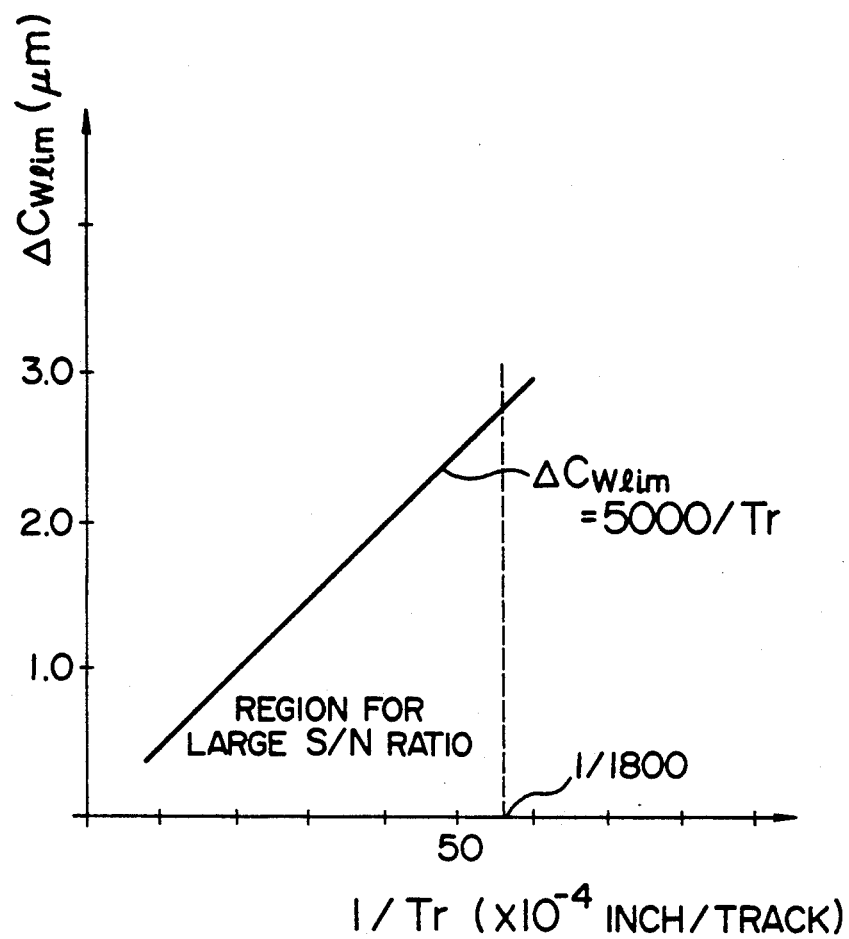
FIG. 7 is a graph showing the relation of the reciprocal of track density to the limit of the difference in width between the upper and lower magnetic pole tips of the thin film magnetic head.

FIG. 7 shows the relation between the track density (Tr) of the magnetic disc and $\Delta CW_{lim}$, demonstrating that the value of $\Delta CW_{lim}$ is substantially proportional to the reciprocal of track density (1/Tr) and the proportional constant is about 5000.

It has also been proved that the value of $\Delta CW_{lim}$ as measured for the difference ($\Delta CW'$) at each of the lateral ends between the side CWU and the side CWD is also substantially proportion to the reciprocal of track density (1/Tr) and the proportional constant is about 2500.

Accordingly, in the magnetic disc apparatus of high recording density using the magnetic disc having a track density which is 1800 or more tracks per inch, the S/N ratio can be higher within the range of $$0 < \Delta CW \leq 5000/Tr$$

or $$0 < \Delta CW' \leq 2500/Tr$$

than at $\Delta CW = 0$ or $\Delta CW' = 0$.

In accordance with the invention, the thin film magnetic head having a high S/N ratio can be achieved for use in the magnetic disc apparatus having a track density of 1800 or more tracks per inch and high density recording can be ensured by the magnetic disc apparatus.

Further, conditions imposed on the configuration of the magnetic pole tip of the thin film magnetic head used in the magnetic disc apparatus of high recording density are clarified.

Furthermore, the thin film magnetic head and magnetic disc suitable for use in the magnetic disc apparatus of high recording density are clarified.

Figure 1:
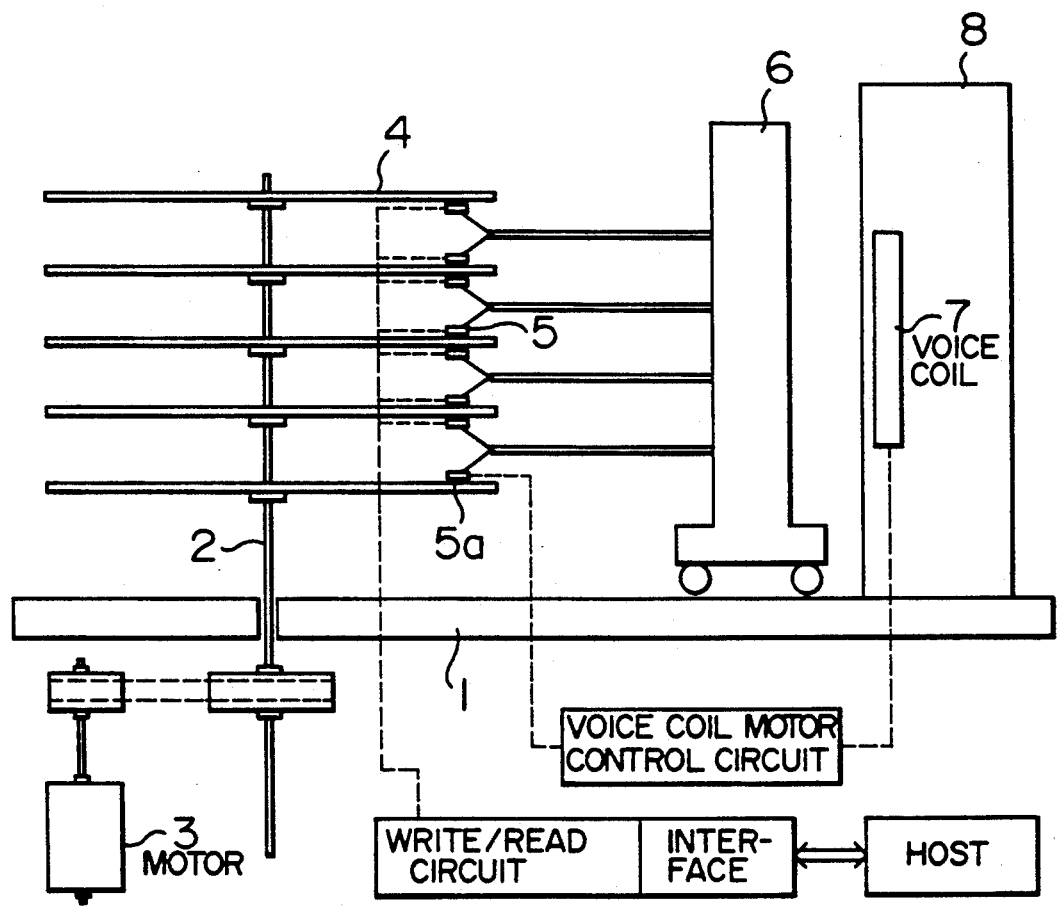
FIG. 1 is a schematic diagram illustrating an embodiment of a magnetic disc apparatus according to the invention.

Now, the description will be made of practical embodiments of the present invention. FIG. 1 is a schematic diagram illustrating an embodiment of the magnetic disc apparatus according to the invention.

Structurally, the magnetic disc apparatus has components designated by reference numerals 1 to 8 and a voice coil motor control circuit, as shown in FIG. 1.

Denoted by 1 is a base and by 2 is a spindle.

A plurality of circular magnetic discs 4 are supported on the single spindle in a manner shown in FIG. 1.

As an example, the single spindle carries five magnetic discs, but the number of magnetic discs is in no way limited to five.

As an alternative, a plurality of spindles may be provided each carrying a plurality of magnetic discs in the manner shown in FIG. 1.

Denoted by 3 is a motor for driving the spindle 2 to rotate the magnetic discs.

Denoted by 5 are magnetic heads for data and by 5a is a magnetic head for positioning.

Denoted by 6 is a carriage, by 7 is a voice coil and by 8 is a magnet.

The voice coil 7 and magnet 8 constitute a voice coil motor.

Positioning of the head is carried out by means of the carriage 6, voice coil 7 and magnet 8.

The voice coil 7 is connected to the magnetic head 5a through the voice coil motor control circuit.

In FIG. 1, a host apparatus is comprised of, for example, a computer system.

Figure 2A:
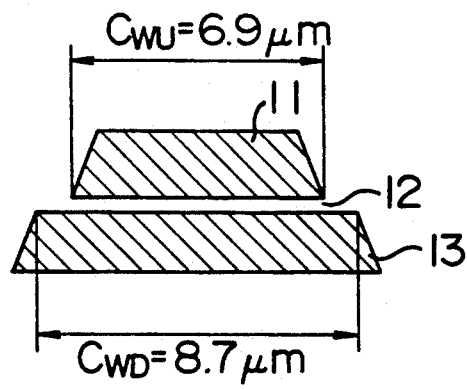
FIGS. 2A and 2B show a contour configuration, as viewed from its side facing the magnetic disc, in one embodiment of the magnetic pole tip used in the thin film magnetic head.
Figure 2B:
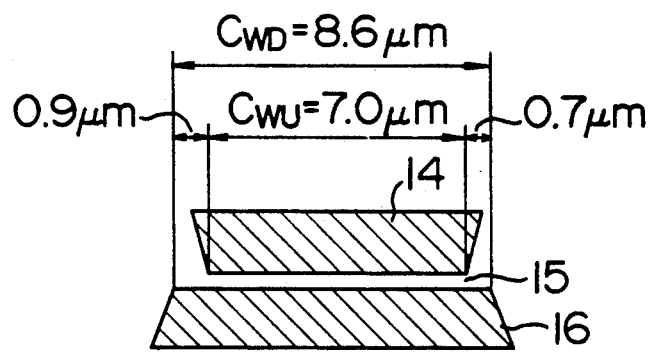

The thin film magnetic head 5 in FIG. 1 has a magnetic pole tip having a contour configuration, exposed to its plane confronting the magnetic disc 4, as exaggeratedly illustrated in FIGS. 2A and 2B.

Figure 11:
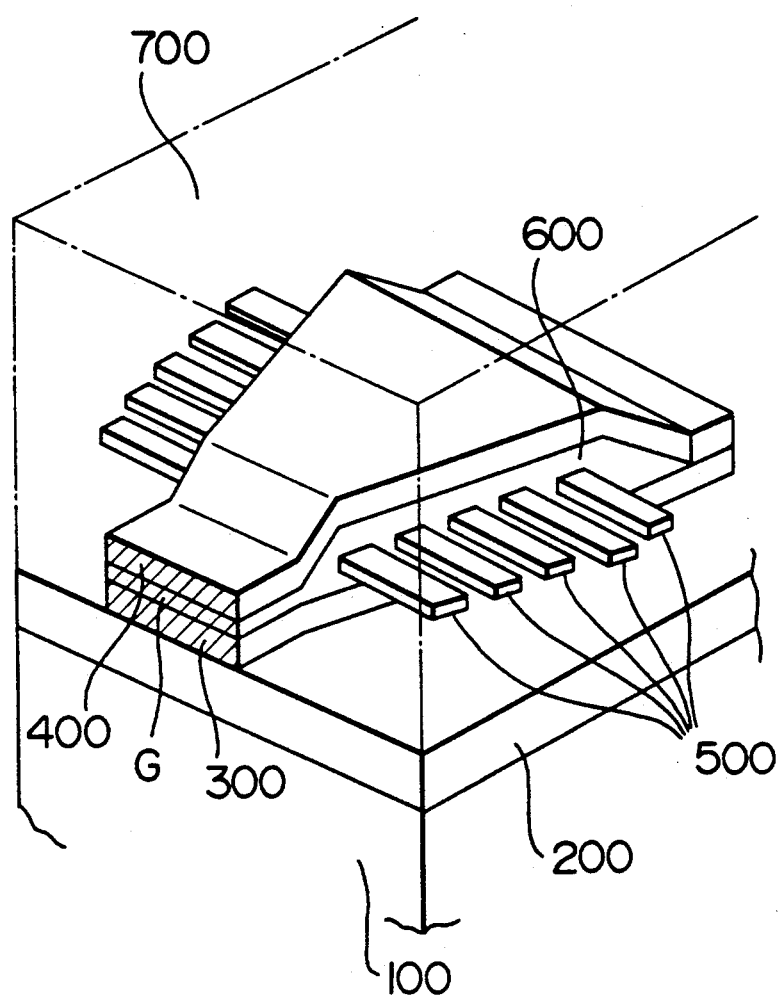
FIG. 11 is a perspective view illustrating the construction of the thin film magnetic head.

The thin film magnetic head is constructed as shown in FIG. 11.

In FIG. 11, reference numeral 100 designates a base plate and 200 a foundation film for formation of a flat surface.

Stacked on the foundation film 200 are a lower magnetic pole tip 300 made of a magnetic material, an insulating film 600 for defining a magnetic gap G and an upper magnetic pole tip 400 also made of the magnetic material in this order.

Coil conductors 500 are embedded in the insulating film 600 and electrically energized to induce a magnetic field.

Reference numeral 700 designates a protective film deposited on the upper magnetic pole tip 400.

A hatched portion in FIG. 11 is specifically configured as shown in FIG. 2A or 2B.

In accordance with teachings of the invention, the thin film magnetic head for use in the magnetic disc apparatus having a track density of 2500 tracks per inch uses magnetic cores having a contour configuration, exposed at its plane facing to the recording medium, as shown in FIG. 2A or 2B.

Particularly, in a thin film magnetic head which uses a magnetic pole tip prepared by magnetron sputtering of a magnetic material and patterning through an ion beam etching process, the magnetic pole tip has a contour configuration, exposed to its plane confronting the magnetic disc, as shown in FIG. 2A.

In the magnetic pole tip shown in FIG. 2A, an upper magnetic pole tip 11 has a width (CWU) of 6.9 μm along a magnetic gap 12, and a lower magnetic pole tip 13 has a width of 8.7 μm (CWD) along the magnetic gap 12.

The upper and lower magnetic pole tips 11 and 13 are arranged such that their contours as viewed from the side facing the magnetic disc are symmetrical with respect to a common axis which lies in the writing and reading directions.

Characteristics of the above thin film magnetic head for writing and reading the magnetic disc apparatus were examined and the results showed that the S/N ratio was increased by 4.3% as compared to a magnetic head having CWU=6.9 μm and CWD=9.1 μm.

On the other hand, in a thin film magnetic head using a magnetic core as shown at FIG. 2B in which a lower magnetic pole tip 16 is prepared by magnetron sputtering of a magnetic material and patterning through an ion beam etching process and an upper magnetic pole tip 14 is prepared by patterning through a selective plating process using a photoresist mask, the magnetic pole tip has a contour configuration as shown in FIG. 2B.

In the magnetic pole tip shown in FIG. 2B, the upper magnetic pole tip 14 has a width (CWU) of 7.0 μm along a magnetic gap 15 and the lower magnetic pole tip 16 has a width (CWD) of 8.6 μm along the magnetic gap 15.

The difference between one lateral end of the upper magnetic pole tip 14 and the corresponding end of the lower magnetic pole tip 16 is 0.9 μm while the difference between the other lateral end of the upper magnetic pole tip and the corresponding lateral end the lower magnetic pole tip is 0.7 μm.

Characteristics of the above thin film magnetic head for writing and reading the magnetic disc apparatus were examined and results showed that the S/N ratio was increased by 8.6% as compared to a magnetic head having CWU=7.0 μm and CWD=9.5 μm.

Figure 8:
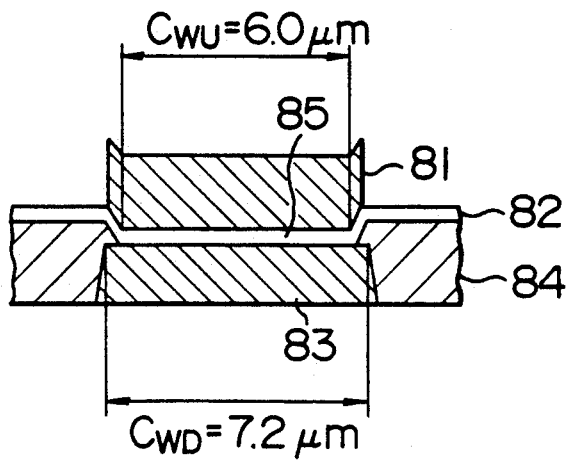
FIG. 8 shows still another embodiment of contour configuration of the magnetic pole tip according to the invention.

In accordance with teachings of the invention, the thin film magnetic head for use in the magnetic disc apparatus having a track density of 3000 tracks per inch uses a magnetic pole arrangement having a contour configuration, at its plane confronting the recording medium, as shown in FIG. 8.

Particularly, in a thin film magnetic head which uses a magnetic pole arrangement prepared by magnetron sputtering of a magnetic material and patterning through an ion beam etching process, the magnetic core arrangement has a contour configuration as shown in FIG. 8.

For formation of this magnetic pole structure, a lower magnetic pole tip 83 is first prepared, a nonmagnetic insulating material 84 is then deposited on both sides and lateral end portions of upper face of the lower magnetic pole tip to form a recess 85 on the top of the lower magnetic pole tip 83, and thereafter a magnetic gap film 82 is deposited to over the nonmagnetic insulating material and the recess.

This preparation process is effective to accurately control the value of CWU.

An upper magnetic pole tip 81 has a width (CWU) of 6.0 μm along the magnetic gap and the lower magnetic pole tip 83 has a width (CWD) of 7.2 μm along the magnetic gap.

Characteristics of the above thin film magnetic head for writing and reading the magnetic disc apparatus were examined and the results showed that the S/N ratio was increased by 8.6% as compared to a magnetic head having CWU=6.0 μm and CWD=8.0 μm.

We claim:

1. A magnetic disc apparatus comprising:
   a magnetic disc for recording thereon information at a track density Tr of 1800 or more tracks per inch; and
   a thin film magnetic head having a main surface facing said magnetic disc and including a magnetic pole structure having an upper magnetic pole tip and a lower magnetic pole tip disposed to form therebetween a magnetic gap extending across said main surface for at least one of writing and reading information in and from said magnetic disc;
   said upper and lower magnetic pole tips having upper and lower tip faces, respectively, exposed on said main surface and adjacent to said magnetic gap, wherein a side of said lower tip face extending along said magnetic gap is longer than a side of said upper tip face extending along said magnetic gap by a difference $\Delta CW$ expressed in μm which satisfies a relation $$0.2 \leq \Delta CW \leq 5000/TR.$$

2. A magnetic disc apparatus according to claim 1, wherein said upper and lower tip faces of said upper and lower magnetic pole tips are substantially symmetrical with respect to a central axis of the main surface of said magnetic head, said axis extending in a direction of at least one of writing and reading by said magnetic head.

3. A magnetic disc apparatus according to claim 1, wherein said magnetic disc records information at a linear bit density of 30 or more kilobits per inch.

4. A magnetic disc apparatus according to claim 1, wherein said magnetic disc records information at an area bit density of 54 or more megabits per square inch.

5. A magnetic disc apparatus according to claim 1, wherein said magnetic disc has, on its surface, a magnetic material having a coercive force of 600 oersteds or more and a thickness of 0.35 μm of less.

6. A magnetic disc apparatus according to claim 1, wherein each magnetic pole tip is made of a single-layer film structure of a magnetic material having a saturation magnetic flux density of one tesla or more.

7. A magnetic disc apparatus according to claim 1, wherein each magnetic pole tip is made of a multi-layer film structure including alternating laminated layers of a magnetic material having a saturation magnetic flux density of one tesla or more and a non-magnetic material.

8. A magnetic disc apparatus according to claim 1, wherein said thin film magnetic head includes a conductor coil, and a number of turns of said conductor coil is 18 turns or more.

9. A magnetic disc apparatus according to claim 1, further comprising means for causing said thin film magnetic head to float at a height of 0.25 μm or less from said magnetic disc when said apparatus is operating.

10. A magnetic disc apparatus according to claim 1, wherein one of said upper and lower magnetic pole tips is made by depositing a magnetic material with a sputtering process and patterning with a dry or wet etching process.

11. A magnetic disc apparatus according to claim 1, wherein one of said upper and lower magnetic pole tips is made by patterning with a selective plating process using a photoresist mask.

12. A magnetic disc apparatus according to claim 1, further comprising:
   means for rotating said magnetic disc; and
   means for positioning said thin film magnetic head with respect to said magnetic disc to enable said thin film magnetic head to record information on a track on said magnetic disk, said positioning means and said thin film magnetic head cooperating with each other to provide said track density Tr of 1800 or more tracks per inch.

13. A magnetic disc apparatus according to claim 1, wherein said thin film magnetic head is a thin film magnetic head for at least one of writing and reading information in and from said magnetic disc by effectively utilizing fringe magnetic fields generated at ends of said magnetic gap.

14. A magnetic disc apparatus comprising:
   a magnetic disc for recording thereon information at a track density Tr of 1800 or more tracks per inch; and
   a thin film magnetic head having a main surface facing said magnetic disc and including a magnetic pole structure having an upper magnetic pole tip and a lower magnetic pole tip disposed to form therebetween a magnetic gap extending across said main surface for at least one of writing and reading information in and from said magnetic disc by effectively utilizing fringe magnetic fields generated at ends of said magnetic gap;
   said upper and lower magnetic pole tips having upper and lower tip faces, respectively, exposed on said main surface and adjacent to said magnetic gap, wherein a side of said lower tip face extending along said magnetic gap is longer than a side of said upper tip face extending along said magnetic gap at each of opposite ends thereof by a difference $\Delta CW'$ expressed in $\mu m$ which satisfies a relation $$0.1 \leq \Delta CW' \leq 2500/Tr.$$

15. A magnetic disc apparatus comprising:
   a magnetic disc for recording thereon information at a track density Tr of 1800 or more tracks per inch; and
   a thin film magnetic head having a main surface facing said magnetic disc and including a magnetic pole structure having an upper magnetic pole tip and a lower magnetic pole tip disposed to form therebetween a magnetic gap extending across said main surface for at least one of writing and reading information in and from said magnetic disc by effectively utilizing fringe magnetic fields generated at ends of said magnetic gap;
   said upper and lower magnetic pole tips having upper and lower tip faces, respectively, exposed on said main surface and adjacent to said magnetic gap, wherein a side of said lower tip face extending along said magnetic gap is different in length from a side of said upper tip face extending along said magnetic gap by a difference $\Delta CW$ expressed in $\mu m$ which satisfies a relation $$0.2 \leq \Delta CW \leq 5000/Tr.$$

16. A magnetic disc apparatus according to claim 15, wherein the side of said upper tip face extending along said magnetic gap is shorter than the side of said lower tip face extending along said magnetic gap.

17. A magnetic disc apparatus according to claim 15, wherein the side of one of said upper and lower tip faces extending along said magnetic gap is shorter than the side of the other of said upper and lower tip faces extending along said magnetic gap, and wherein the shorter side forms angles $\theta_S$ with ends of said one of said upper and lower tip faces which satisfy a relation $$45° \leq \theta_S \leq 150°$$

18. A magnetic disc apparatus according to claim 15, wherein the side of one of said upper and lower tip faces extending along said magnetic gap is longer than the side of the other of said upper and lower tip faces extending along said magnetic gap, and wherein the longer side forms angles $\theta_L$ with ends of said one of said upper and lower tip faces which satisfy a relation $$91° \leq \theta_L \leq 150°$$

19. A magnetic disc apparatus according to claim 15, wherein the side of one of said upper and lower tip faces extending along said magnetic gap is shorter than the side of the other of said upper and lower tip faces extending along said magnetic gap such that the side of said other of said upper and lower tip faces is longer than the shorter side of said one of said upper and lower tip faces, and wherein the shorter side forms angles $\theta_S$ with ends of said one of said upper and lower tip faces which satisfy a relation $$45° \leq \theta_S \leq 150°,$$

and the longer side forms angles $\theta_L$ with ends of said other of said upper and lower tip faces which satisfy a relation $$91° \leq \theta_L \leq 150°.$$

20. A magnetic disc apparatus according to claim 15, further comprising:
   means for rotating said magnetic disc; and
   means for positioning said thin film magnetic head with respect to said magnetic disc to enable said thin film magnetic head to record information on a track on said magnetic disc, said positioning means and said thin film magnetic head cooperating with each other to provide said track density Tr of 1800 or more tracks per inch.

21. A magnetic disc apparatus comprising:
   a magnetic disc for recording thereon information at a track density Tr of 1800 or more tracks per inch; and
   a thin film magnetic head having a main surface facing said magnetic disc and including a magnetic pole structure having an upper magnetic pole tip and a lower magnetic pole tip disposed to form therebetween a magnetic gap extending across said main surface for at least one of writing and reading information in and from said magnetic disc by effectively utilizing fringe magnetic fields generated at ends of said magnetic gap;
   said upper and lower magnetic pole tip having upper and lower tip faces, respectively, exposed on said main surface and adjacent to said magnetic gap, wherein a side of said lower tip face extending along said magnetic gap is different in length from a side of said upper tip face extending along said magnetic gap at each of opposite ends thereof by a difference ΔCW' expressed in μm which satisfies a relation $$0.1 \leq \Delta CW' \leq 2500/Tr.$$

22. A magnetic disc apparatus according to claim 21, further comprising:
   means for rotating said magnetic disc; and
   means for positioning said thin film magnetic head with respect to said magnetic disc to enable said thin film magnetic head to record information on a track on said magnetic disc, said positioning means and said thin film magnetic head cooperating with each other to provide said track density Tr of 1800 or more tracks per inch.

23. A thin film magnetic head for use with a magnetic disc adapted to record thereon information at a track density Tr of 1800 or more tracks per inch, said magnetic head comprising:
   a main surface which faces the magnetic disc when in use; and
   a magnetic core structure for providing a magnetic circuit having a magnetic gap extending across said main surface, said magnetic core structure having upper and lower magnetic pole tips made of magnetic material and disposed to provide said magnetic gap therebetween for at least one of writing and reading information in and from said magnetic disc by effectively utilizing fringe magnetic fields generated at opposite ends of said magnetic gap;
   said upper and lower magnetic pole tips having upper and lower tip faces, respectively, exposed on said main surface and adjacent to said magnetic gap, wherein a side of said lower tip face extending along said magnetic gap is different in length from a side of said upper tip face extending along said magnetic gap by a difference ΔCW expressed in μm which satisfies a relation $$0.2 \leq \Delta CW \leq 5000/Tr.$$

24. A recording system comprising:
   a head/disc assembly for performing at least one of magnetic write and read operations;
   a write/read circuit for switching between said write and read operations; and
   an interface for coupling said head/disc assembly to a host apparatus through said write/read circuit;
   said head/disc assembly including:
   a magnetic disc adapted for recording thereon information at a track density Tr of 1800 or more tracks per inch; and
   a thin film magnetic head having a main surface facing said magnetic disc and including a magnetic core structure having upper and lower magnetic pole tips disposed to form therebetween a magnetic gap extending across said main surface for at least one of writing and reading information in and from said magnetic disc by effectively utilizing fringe magnetic fields generated at opposite ends of said magnetic gap;
   said upper and lower magnetic pole tips having upper and lower tip faces, respectively, exposed on said main surface and adjacent to said magnetic gap, wherein a side of said lower tip face extending along said magnetic gap is different in length from a side of said upper tip face extending along said magnetic gap by a difference ΔCW expressed in μm which satisfies a relation $$0.2 \leq \Delta CW \leq 5000/Tr.$$

25. A method of recording and reproducing information on a magnetic disc adapted to record thereon information at a track density Tr of 1800 or more tracks per inch, said method comprising the steps of:
   rotating said magnetic disc; and
   recording information on said magnetic disc with a thin film magnetic head having a main surface disposed such that said main surface is facing said magnetic disc, said magnetic head including a magnetic core structure having upper and lower magnetic pole tips arranged to form therebetween a magnetic gap extending across said main surface, said upper and lower magnetic pole tips having upper and lower tip faces, respectively, exposed on said main surface and adjacent to said magnetic gap, wherein a side of one of said upper and lower tip faces extending along said magnetic different in length from a side of the other of said upper and lower tip faces extending along said magnetic gap by a difference ΔCW expressed in μm which satisfies a relation $$0.2 \leq \Delta CW \leq 5000/Tr.$$

such that the information is recorded on the magnetic disc along a track by effectively utilizing fringe magnetic fields generated at ends of said magnetic gap corresponding to the difference ΔCW such that a width of the track is increased by the fringe magnetic fields; and
reading information recorded on said magnetic disc with said magnetic head disposed such that said main surface is facing said magnetic disc and effectively utilizing a whole length of the magnetic pole tip having said one of said upper and lower tip faces.

26. A method of recording and reproducing information on a magnetic disc adapted to record thereon information at a track density Tr of 1800 or more tracks per inch, said method comprising the steps of:
   rotating said magnetic disc;
   recording information on said magnetic disc with a thin film magnetic head having a main surface disposed such that said main surface is facing said magnetic disc, said magnetic head including a magnetic core structure having upper and lower magnetic pole tips arranged to form therebetween a magnetic gap extending across said main surface, said upper and lower magnetic pole tips having upper and lower tip faces, respectively, exposed on said main surface and adjacent to said magnetic gap, wherein a side of one of said upper and lower tip faces extending along said magnetic different in length from a side of the other of said upper and lower tip faces extending along said magnetic gap by a difference ΔCW expressed in μm which satisfies a relation $$0.2 \leq \Delta CW \leq 5000/Tr.$$

such that the information is recorded on the magnetic disc along a track by effectively utilizing fringe magnetic fields generated at ends of said magnetic gap corresponding to the difference ΔCW such that a width of the track is increased by the fringe magnetic fields; and reading information recorded on said magnetic disc with a magnetoresistance-type magnetic head.

27. A magnetic disc apparatus comprising:
a magnetic disc for recording information thereon; and
a thin film magnetic head for recording information on said magnetic disc at a track density Tr of 1800 or more tracks per inch, said magnetic head having a main surface facing said magnetic disc and including a magnetic core structure having upper and lower magnetic pole tips disposed to form a magnetic gap therebetween extending across said main surface, said upper and lower magnetic pole tips having upper and lower tip faces, respectively, exposed on said main surface and adjacent to said magnetic gap, wherein a side of one of said upper and lower tip faces extending along said magnetic gap is longer than a side of the other of said upper and lower tip faces extending along said magnetic gap at each of opposite ends thereof by a difference ΔCW' expressed in μm which satisfies a relation $$0.1 \leq \Delta CW' \leq 2500/Tr,$$

such that fringe magnetic fields generated at opposite ends of said magnetic gap are effectively utilized for recording information on said magnetic disc.

28. A magnetic disc apparatus according to claim 27, further comprising:
means for rotating said magnetic disc; and
means for positioning said thin film magnetic head with respect to said magnetic disc to enable said thin film magnetic head to record information on a track on said magnetic disc, said positioning means and said thin film magnetic head cooperating with each other to provide said track density Tr of 1800 or more tracks per inch.

29. A magnetic disc apparatus according to claim 27, further comprising a magnetoresistance-type magnetic head for reading information recorded on said magnetic disc.

30. A magnetic disc apparatus comprising:
a magnetic disc for recording information thereon;
a thin film magnetic head for recording information on said magnetic disc at a track density Tr of 1800 or more tracks per inch, said magnetic head having a main surface facing said magnetic disc and including a magnetic core structure having upper and lower magnetic pole tips disposed to form a magnetic gap therebetween extending across said main surface, said upper and lower magnetic pole tips having upper and lower tip faces, respectively, exposed on said main surface and adjacent to said magnetic gap, wherein a side of one of said upper and lower tip faces extending along said magnetic gap is longer than a side of the other of said upper and lower tip faces extending along said magnetic gap by a difference ΔCW expressed in μm which satisfies a relation $$0.2 \leq \Delta CW \leq 5000/Tr,$$

such that fringe magnetic fields generated at opposite ends of said magnetic gap are effectively utilized for recording information on said magnetic disc.

31. A magnetic disc apparatus according to claim 30, further comprising:
means for rotating said magnetic disc; and
means for positioning said thin film magnetic head with respect to said magnetic disc to enable said thin film magnetic head to record information on a track on said magnetic disc, said positioning means and said thin film magnetic head cooperating with each other to provide said track density Tr of 1800 or more tracks per inch.

32. A magnetic disc apparatus according to claim 36, further comprising a magnetoresistance-type magnetic head for reading information recorded on said magnetic disc.

33. A magnetic disc apparatus comprising:
a spindle;
a plurality of magnetic discs rotatably mounted on said spindle, each of said magnetic discs for recording thereon information at a track density Tr of 1800 or more tracks per inch; and
a plurality of thin film magnetic heads disposed to face associated ones of said magnetic discs, each of said magnetic heads having a main surface facing the associated magnetic disc and including a magnetic pole structure having an upper magnetic pole tip and a lower magnetic pole tip disposed to form therebetween a magnetic gap extending across said main surface for at least one of writing and reading information in and from the associated magnetic disc by effectively utilizing fringe magnetic fields generated at ends of said magnetic gap;
said upper and lower magnetic pole tips having upper and lower tip faces, respectively, exposed on said main surface and adjacent to said magnetic gap, wherein a side of said lower tip face extending along said magnetic gap is different in length from a side of said upper tip face extending along said magnetic gap by a difference ΔCW expressed in μm which satisfies a relation $$0.2 \leq \Delta CW \leq 5000/Tr.$$

34. A magnetic disc apparatus comprising:
a magnetic disc adapted for recording thereon information at a track density Tr of 1800 or more tracks per inch; and
a thin film magnetic head having a main surface facing said magnetic disc and including a magnetic pole structure having an upper magnetic pole tips and a lower magnetic pole tip disposed to form therebetween a magnetic gap extending across said main surface for at least one of writing and reading information in and from said magnetic disc by effectively utilizing fringe magnetic fields generated at ends of said magnetic gap;
said upper and lower magnetic pole tips having upper and lower tip faces, respectively, exposed on said main surface and adjacent to said magnetic gap, wherein a side of said lower tip face extending along said magnetic gap is longer than a side of said upper tip face extending along said magnetic gap at least one of opposite ends thereof by a difference ΔCW' expressed in μm which satisfies a relation $$0.1 \leq \Delta CW' \leq 2500/Tr,$$

35. A magnetic disc apparatus comprising:
a magnetic disc for recording thereon information at a track density Tr of 2500 or more tracks per inch; and
a thin film magnetic head having a main surface facing said magnetic disc and including a magnetic pole structure having an upper magnetic pole tip and a lower magnetic pole tip disposed to form therebetween a magnetic gap extending across said main surface for at least one of writing and reading information in and from said magnetic disc by effectively utilizing fringe magnetic fields generated at ends of said magnetic gap;
said upper and lower magnetic pole tips having upper and lower tip faces, respectively, exposed on said main surface and adjacent to said magnetic gap, wherein a side of said lower tip face extending along said magnetic gap is longer than a side of said upper tip face extending along said magnetic gap by a difference $\Delta CW$ expressed in $\mu m$ which satisfies a relation $$0.2 \leq \Delta CW \leq 5000/Tr.$$

36. A magnetic disc apparatus comprising:
a magnetic disc adapted for recording thereon information at a track density Tr of 1800 or more tracks per inch; and
a thin film magnetic head having a main surface facing said magnetic disc and including a magnetic core structure having an upper magnetic pole tip and a lower magnetic pole tip disposed to form therebetween a magnetic gap extending across said main surface for at least one of writing and reading information in and from said magnetic disc by utilizing fringe magnetic fields generated at ends of said magnetic gap;
said upper and lower magnetic pole tips having upper and lower tip faces, respectively, exposed on said main surface and adjacent to said magnetic gap, wherein a side of said lower tip face extending along said magnetic gap is longer than a side of said upper tip face extending along said magnetic gap by a difference $\Delta CW$ expressed in $\mu m$ which satisfies a relation $$0.2 \leq \Delta CW \leq 5000/Tr.$$

* * * * *